United States Patent [19]

Stahl et al.

[11] 4,402,624

[45] Sep. 6, 1983

[54] DEVICE FOR ADJUSTING THE SLOPE OF A KEYBOARD

[75] Inventors: Horst Stahl, Weidach; Walter Wachs, Krailling, both of Fed. Rep. of Germany

[73] Assignee: Siemens Aktiengesellschaft, Berlin & Munich, Fed. Rep. of Germany

[21] Appl. No.: 248,243

[22] Filed: Mar. 27, 1981

[30] Foreign Application Priority Data

Apr. 15, 1980 [DE] Fed. Rep. of Germany ....... 3014423

[51] Int. Cl.³ .......................... B41J 11/56; B41J 29/06
[52] U.S. Cl. .................................... 400/681; 400/472; 108/7
[58] Field of Search ....................... 400/681, 682, 472; 108/7, 32; 248/396, 397, 649, 650, 188.2

[56] References Cited

U.S. PATENT DOCUMENTS

| 726,921 | 5/1903 | Willard | 108/7 X |
|---|---|---|---|
| 1,331,441 | 2/1920 | Latta | 400/681 |
| 1,385,256 | 7/1921 | McCann . | |
| 1,676,809 | 7/1928 | Uhlig | 400/681 |
| 2,281,769 | 5/1942 | Hochriem | 248/649 |
| 2,451,722 | 10/1948 | Dodge | 400/186 X |
| 2,540,297 | 2/1951 | Freeman et al. | 400/681 |
| 2,979,857 | 4/1961 | Longbotham | 248/649 X |
| 3,069,543 | 12/1962 | Sazavsky | 108/7 |
| 3,750,989 | 8/1973 | Bergeson | 248/650 |
| 3,830,352 | 8/1974 | Kolpek . | |
| 3,902,034 | 8/1975 | Isozaki . | |
| 4,008,920 | 2/1977 | Arndt | 248/397 X |

FOREIGN PATENT DOCUMENTS

| 95908 | 2/1924 | Austria | 400/681 |
|---|---|---|---|
| 2539061 | 3/1977 | Fed. Rep. of Germany . | |
| 7711882 | 10/1977 | Fed. Rep. of Germany . | |
| 55-87558 | 7/1980 | Japan | 400/110 |

OTHER PUBLICATIONS

IBM Technical Disclosure Bulletin, vol. 22, No. 2. Jul. 1979, p. 808, "Adjustable Height Mechanism" Leon et al.

Primary Examiner—Edgar S. Burr
Assistant Examiner—Charles A. Pearson
Attorney, Agent, or Firm—Hill, Van Santen, Steadman & Simpson

[57] ABSTRACT

The inclination angle of a keyboard is made infinitely adjustable between preset maximum and minimum angles to suit individual operator and work place needs by means of an adjustment assembly. The assembly calls for selectably setting cam plate housing seats located at one end of the keyboard to increase or lower the angle of inclination.

6 Claims, 3 Drawing Figures

DEVICE FOR ADJUSTING THE SLOPE OF A KEYBOARD

BACKGROUND OF THE INVENTION

The invention relates to a keyboard assembly and, more particularly, to means for varying the slope of the working face of the keyboard.

Increasingly, ergonomic demands are playing a role in the construction and use of keyboards, such as a telex machine or a type-keyboard for a printer. The height of the keyboard plays a significant role in this regard. It has been found that an inclination angle of 6 degrees from horizontal is functionally preferable in general for an average size operator using a keyboard having a keyboard height (measured at the center row of keys) of 30 mm. However, keyboards fixed with an inclination angle of 6 degrees only meet the optimal ergonomic standards of one category of work place and operator. Since typical keyboards are not constructed for ready height adjustment, adaptation to different work conditions is not possible or possible only after requiring substantial time and expense for adjustment.

An object of the present invention is to enable a keyboard operator to adjust the angle of inclination of a keyboard to suit the particular working conditions. Further objects are to make adjustments easy to carry out at any time at a work place to suit the personal needs of the operator and cause the adjustments to be done with means which keep structural expenses to a minimum. These objects are achieved in the present invention.

SUMMARY OF THE INVENTION

A keyboard assembly is provided with a hand-operated adjustment mechanism by which the inclination of the working face of the keyboard can be continuously set at any time between a minimum and a maximum angle of inclination. The adjustment mechanism comprises a cam plate means used as support at the back end of a keyboard. The cam plate means having variable settings arrived at by rotation of an adjustment shaft which is operated by a series of gear members driven from a control shaft. The control shaft is connected at one end with a hand wheel readily accessible by the operator at adjacent the back endwall of the keyboard. The assembly entails a minimum of mechanical features, thus keeping structural outlay to a minimum and guaranteeing a nearly maintenance free operation.

Snap locks are provided in the keyboard housing to seat the adjustment shaft and control shaft. The provision of snap locks further minimizes the cost of fabrication and assembly for the adjustment assembly, while still guaranteeing secure seatings.

DESCRIPTION OF THE PREFERRED EMBODIMENT

Figure 1:
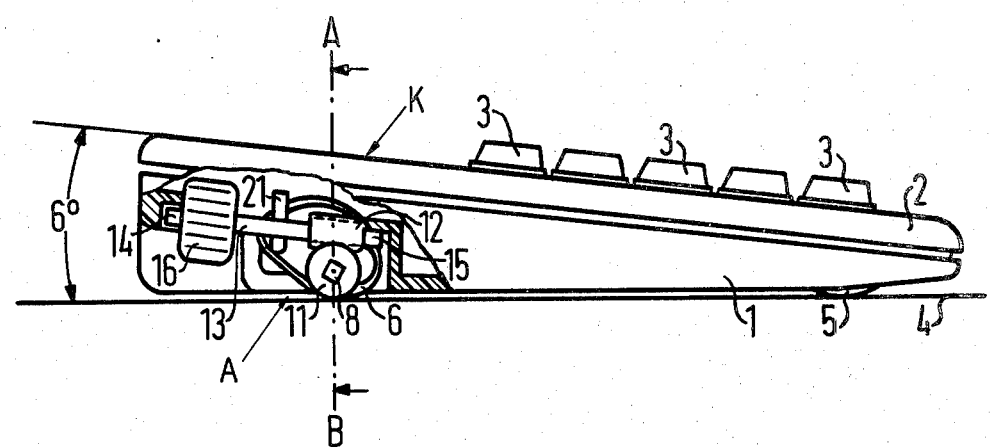
FIG. 1 is partly broken-away side elevational view of a keyboard having an adjustment assembly in its lowered position according to the present invention.
Figure 2:
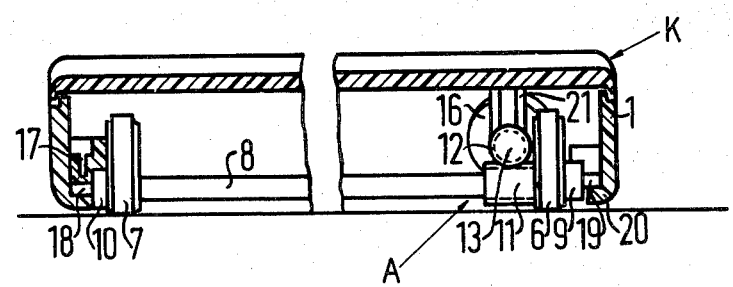
FIG. 2 is a cross-sectional view taken along the lines A-B of FIG. 1.

FIGS. 1 and 2 illustrate a keyboard K, such as for a telex machine or a type-keyboard for an office printer, having base and upper housing parts 1 and 2, respectively, and a bank of keys 3 along the working face of the keyboard. The housing parts, especially the base part 1, are preferably plastic molded. The working face may be minimally inclined at an angle of 6 degrees with respect to a work place or support surface 4.

At the front end of the keyboard K are provided shallow, fixed seating elements or blocks 5. At the back end of the keyboard is an adjustment assembly A, which enables the back end to be raised and lowered relative to the front end so that inclination of the working face may be variably increased or lowered to suit the particular ergonomic demands of individual operators and work place.

The adjustment assembly A contains two spaced-apart seating elements in the form of matching cam plates 6 and 7 disposed on an adjustment shaft 8. The adjustment shaft is an elongated rod having a polygonal cross-section, such as square or hexagonal, and contains centering or stop portions 9 and 10 positioned outside of the cam plates 6 and 7. The stops 9 and 10 fit in correspondingly shaped recesses formed in the bottom surface of the base housing 1.

A lateral helical gear member 11 is provided about the shaft 8 adjacent at least one cam plate 6 for driving interconnection with a further helical gear member 12 mounted on an axially extending control shaft 13. Opposed bearing ends 14 and 15 of the control shaft are seated in correspondingly shaped recesses in the bottom surface of the base 1. Located in an access space adjacent the back end of the keyboard K is a hand wheel 16, having a grooved surface for manual operation. The hand wheel 16 is fitted onto the control shaft 13 and permits an operator to manually rotate the control shaft, thus actuating adjustment of the cam plate seatings 6 and 7.

Figure 3:
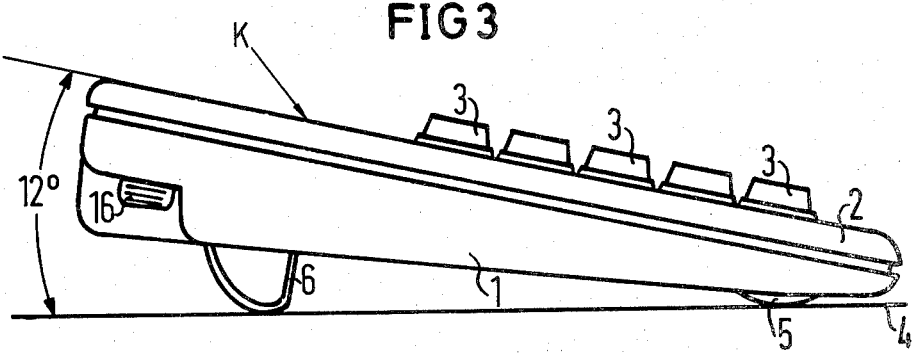
FIG. 3 is a side elevational view of the keyboard of FIG. 1 when the adjustment assembly is in its maximum raised position.

Operation of the adjustment assembly is as follows. By turning the hand wheel 16, the cam plate 6 is rotated on the adjustment shaft 8 via the control shaft 13 and the two gears 12 and 11. The cam plate 7, connected for rotation with the shaft 8, is likewise rotated with the cam plate 6. Due to the eccentric shape of the cam plates 6 and 7, the keyboard K is elevated at one end and the angle of inclination is increased. Adjustment of the angle of inclination can ensue infinitely between a minimum and a maximum value, here shown, for example, to be between 6° and 12°. The gear teeth 11 and 12 are designed as helical gearings and, as a result of their interlock, prevent free reversal or return of the control shaft 13. The minimum limitation value of the angle of inclination is limited by means of the bottom surface edges in the lower part 1 of the keyboard housing with which the shallow eccentric portions of the cam plates 6 and 7 may be matched. The maximum inclination angle is limited by the degree of eccentricity provided on the cam plates 6 and 7. An example in which the keyboard is inclined to a maximum angle of inclination of 12° with respect to the stable surface 4 is shown in FIG. 3.

The adjustment shaft 8 is preferably seated at one end in the base housing 1 by snap-lock means comprising a resilient clamp-like suitable projection or shoulder piece 17 formed on the base housing 1 to snap-fit receive and retain a reduced diameter tappet or stub pin end 18 of the shaft 8. At the other end of the shaft 8, an opposed reduced diameter tappet or stub pin end 19 of the shaft rests on a ledge 20 formed on the base part 1 of the housing. To assemble, the tappet end 19 is first brought into engagement with the housing ledge 20. Then, the tappet 18 is snapped into the resilient projection 17. Attachment of the control shaft 13 in the housing occurs in a similar manner with a resilient snap-lock clamp 21 holding the shaft 13 generally intermediately along its length against housing support ledges at the opposed shaft ends. Thus, the assembly shafts 8 and 13 can be easily snapped into position beneath the keyboard K.

The cam plates 6 and 7 are put in place on the shaft 8 with mountings which fit over the shaft, this being particularly simple when a square rod is employed as the shaft 8.

A material, for example a rubber ring, which increases the friction between the seating elements and the stable surface 4 may be applied to the outer surfaces of the cam plates 6 and 7 in order to increase stability.

The adjustment assembly A of the present invention is readily adaptable to different keyboards having varying widths by simply using an adjustment shaft 8 having the appropriate length.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for adjusting the inclination angle of a keyboard having a housing and a generally planar working face for a bank of keys comprising a laterally extending adjustment shaft mounted for rotation adjacent one end of said keyboard housing, at least two matching eccentric cam plates disposed and aligned to provide equal lift for rotation on said adjustment shaft at opposed ends thereof for forming seating support surfaces for said one end of said keyboard housing, and control means for enabling selective rotation of said adjustment shaft to infinitely vary the inclination of said keyboard housing between minimum and maximum values as defined by the eccentricity of said cam plates, wherein said control means comprises a rotatable control shaft entirely within said keyboard housing having a first gear member disposed thereon for driving interconnection with a second gear member disposed on said adjustment shaft, and wherein said control means further comprises a hand wheel mounted on said control shaft to rotate it, said housing having a recess permitting operator access to said hand wheel.

2. The apparatus of claim 1, wherein said first and second gear members have helical gear teeth.

3. The apparatus of claim 1, wherein said adjustment shaft is of a polygonal cross-section.

4. The apparatus of claim 1, wherein each said cam plate is coated with material means for increasing the seating surface friction of said cam plates.

5. The apparatus of claim 4, wherein said material means is a rubber ring.

6. The apparatus of claim 1, wherein said adjustment shaft is positioned adjacent the back end of said housing.

* * * * *